US010445736B2

(12) United States Patent
Kohli

(10) Patent No.: US 10,445,736 B2
(45) Date of Patent: Oct. 15, 2019

(54) WALLET MANAGEMENT SYSTEM

(71) Applicant: MasterCard International Incorporated, Purchase, NY (US)

(72) Inventor: Manoneet Kohli, O'Fallon, MO (US)

(73) Assignee: Mastercard International Incorporated, Purchase, NY (US)

( * ) Notice: Subject to any disclaimer, the term of this patent is extended or adjusted under 35 U.S.C. 154(b) by 722 days.

(21) Appl. No.: 15/156,712

(22) Filed: May 17, 2016

(65) Prior Publication Data

US 2017/0337556 A1    Nov. 23, 2017

(51) Int. Cl.
G06Q 20/40 (2012.01)
G06Q 20/36 (2012.01)

(52) U.S. Cl.
CPC ........ G06Q 20/4016 (2013.01); G06Q 20/36 (2013.01); G06Q 20/3674 (2013.01); G06Q 20/40 (2013.01)

(58) Field of Classification Search
USPC ....................................................... 235/375
See application file for complete search history.

(56) References Cited

U.S. PATENT DOCUMENTS

| 5,872,844 A * | 2/1999 | Yacobi | G06Q 20/06 705/39 |
| 2003/0009422 A1 | 1/2003 | Gopalan | |
| 2013/0024371 A1* | 1/2013 | Hariramani | G06Q 20/36 705/41 |
| 2014/0006277 A1 | 1/2014 | Rao | |
| 2014/0136349 A1 | 5/2014 | Dave et al. | |
| 2015/0348039 A1* | 12/2015 | Allen | G06Q 20/4016 705/44 |
| 2016/0078444 A1* | 3/2016 | Tomasofsky | G06Q 20/36 705/44 |
| 2016/0203486 A1* | 7/2016 | Ericson | G06Q 20/4016 705/44 |

OTHER PUBLICATIONS

"PCT Notification of Transmittal of the International Search Report and the Written Opinion", of the International Searching Authority, or the Declaration, dated Jul. 31, 2017 (Jul. 31, 2017), for International Application No. PCT/US2017/028219, 12pgs.

* cited by examiner

Primary Examiner — Michael G Lee
Assistant Examiner — David Tardif
(74) Attorney, Agent, or Firm — Buckley, Maschoff & Talwalkar LLC

(57) ABSTRACT

Provided are a system and method for managing digital wallets and thereby preventing unauthorized transactions. An exemplary method includes receiving a plurality of data feeds including a data feed from at least one wallet provider and a data feed from at least one fraud system, and receiving a security notification for a payment card, identifying a digital wallet which the payment card is associated with based on the received data feeds, identifying one or more other payment cards associated with the identified digital wallet based on the received data feeds, and generating a warning for the one or more other identified payment cards, and storing the warning for use during an authorization request of the one or more other identified payment cards.

20 Claims, 6 Drawing Sheets

WALLET MANAGEMENT SYSTEM

FIELD

The example embodiments described herein relate generally to digital wallets used for the payment of goods and/or services and, more particularly, to a system for globally managing digital wallets thereby improving the security of the digital wallets and the payment cards included therein.

BACKGROUND

Due to the recent increase in the amount of real-time transactions and the amount of on-demand purchasing, consumers have come to expect near-instant gratification. As a result, merchants, issuers, and payment card companies are not provided much time to determine whether a transaction is potentially fraudulent. Often, a transaction is authorized within seconds. With such a small window of time for review, it is difficult for merchants to ensure that purchases are not being made by scammers or fraudsters buying with stolen credit card information. Adding to this pain is that chargebacks and fees associated therewith can be charged weeks or even months after the transaction.

To make purchasing even easier, recently businesses and consumers have been turning to digital wallets. A digital wallet may be installed on a user's device and may store payment information and passwords for numerous payment methods (e.g., payment cards) and websites. Through the use of a digital wallet, a user can complete in-store purchases easily and quickly with near-field communication. A user may also easily complete remote purchases online without having to remember and input specific details such as usernames, passwords, contact information, and the like. By storing all of a consumer's payment information compactly, digital wallets largely eliminate the need to carry a physical wallet. Also, digital wallets are a potential benefit to companies that collect consumer data. The more companies know about their customers' purchasing habits, the more effectively they can market to them.

Most digital wallets allow a consumer the ability to store more than one payment card within the digital wallet. Furthermore, a consumer is typically able to store more than one digital wallet on their mobile device. While individual payment cards have fraud identification systems capable of detecting potential fraud involving a particular payment card, the fraud identification systems are typically not aware of whether the payment card is included in a digital wallet, and if so, whether there are other payment cards included within the digital wallet. When an attacker gains access to a user's digital wallet, all payment cards included therein may be compromised. However, the fraud systems of a first payment card having a first card scheme and/or a first issuer are typically unaware of fraud occurring with a second payment card included in the digital wallet having a different card scheme and/or issuer. That is, even if a fraud detection system detects a potential attack or fraud associated with one of the payment cards, the fraud detection system has no way of informing the providers of other payment cards included in the digital wallet that their cards might be compromised. Furthermore, not all merchants are enrolled in a secure code program and cannot enforce a user authentication check with respect to the wallet. Therefore, a system for improving global wallet security is needed.

BRIEF DESCRIPTION OF THE DRAWINGS

Features and advantages of the exemplary embodiments, and the manner in which the same are accomplished, will become more readily apparent with reference to the following detailed description taken in conjunction with the accompanying drawings.

Figure 1:
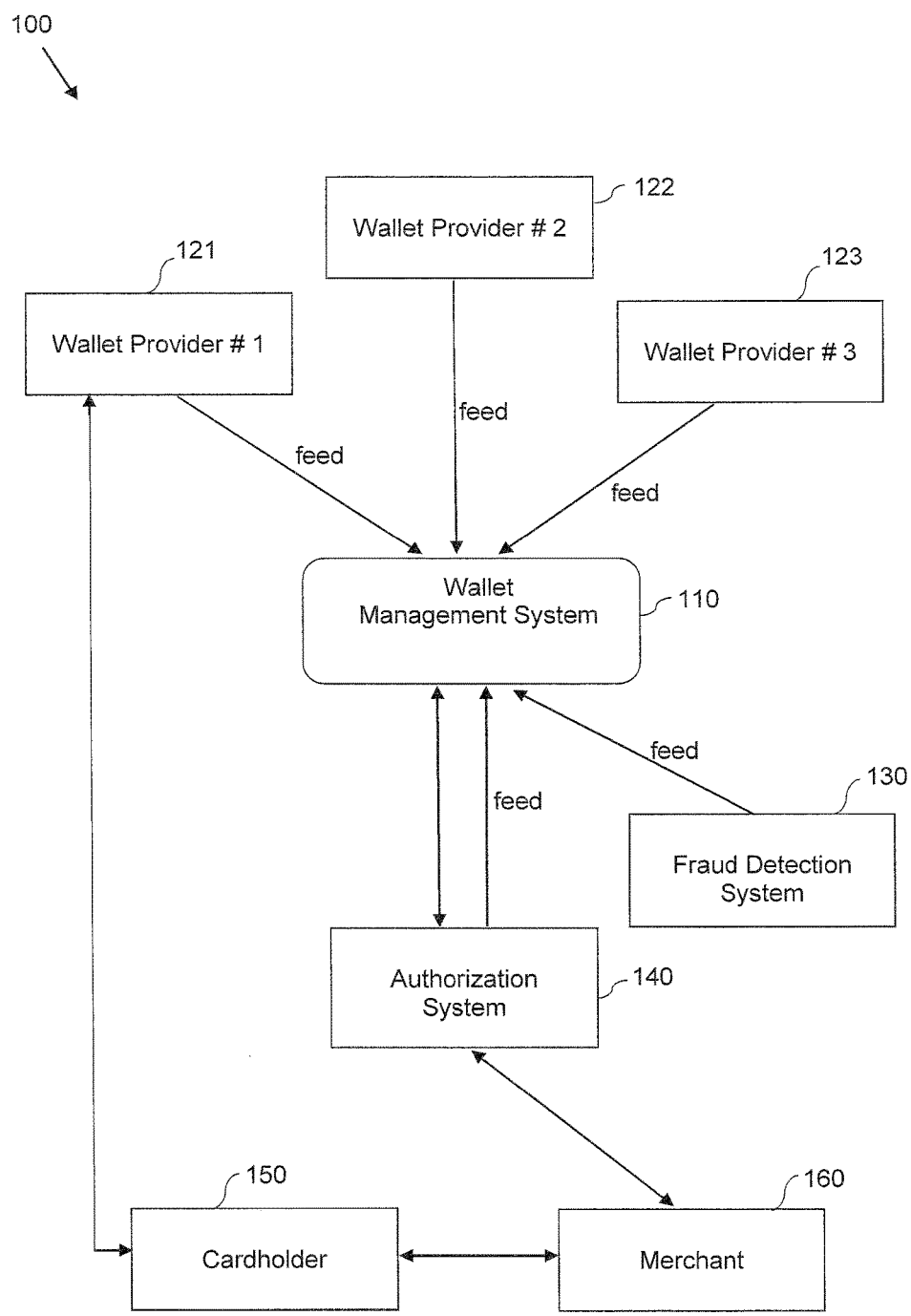
FIG. 1 is a diagram illustrating a wallet management system in accordance with an exemplary embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various exemplary embodiments. It should be appreciated that various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The exemplary embodiments described herein relate to a wallet management system that receives a security notification for a payment card included in a digital wallet, and generates a warning for other payment cards included in the digital wallet thereby preventing them from being used fraudulently and further improving the overall security of the payment cards. The wallet management system may receive data feeds from wallet service providers and from fraud detection systems such as card scheme fraud detection systems, payment processing systems, and the like. Using the data included in the data feeds, the wallet management system may build a wallet management map, table, and/or the like, which uniquely identifies each digital wallet along with each payment card associated with each digital wallet. For example, each digital wallet included in the wallet management map may have a unique ID, and each payment card associated with a digital wallet may be identified by an account number or a hash value of the account number. The term "map" as used herein should not be construed as limiting the scope of the exemplary embodiments, and may include any other form of data storage, for example, tables, cells, fields, and the like.

A security notification for a payment card may be detected by a fraud system included in the wallet management system. For example, the security notification may indicate a potential fraudulent use of the payment card, a locked payment card, a declined transaction using the payment card as a result of potential fraud, an excessive chargeback, a failed authentication, a locked primary account number (PAN), and the like. When the security notification is detected for a payment card associated with a digital wallet included in the wallet management map, the wallet management system may flag the other payment cards included in the digital wallet using the wallet management map as a preventative measure. Accordingly, when a person attempts to use one of the other flagged payment cards either through the digital wallet or on its own, the wallet management system may identify that the payment card has been flagged and decline the transaction or issue an additional challenge to the cardholder to verify the identity of the cardholder. By flagging other payment cards, the opportunity for fraud with those other cards may be prevented or otherwise prohibited.

FIG. 1 illustrates a wallet management network 100 in accordance with an exemplary embodiment. Referring to FIG. 1, the wallet management network 100 includes a wallet management system 110, a plurality of wallet providers 121, 122, and 123, a fraud detection system 130, an authorization system 140, a cardholder 150, and a merchant 160. It should be appreciated that the network 100 may include additional devices not shown, more or less wallet providers, more or less fraud detection systems, and the like. Also, in this example, the cardholder 150 may correspond to a cardholder device, for example, a mobile phone, a tablet, a phablet, a smart wearable device, a notebook, an appliance, and the like. Likewise, the merchant 160 may correspond to a computing device such as a point-of-sale (POS) terminal, a computer, a server, and the like.

In this example, each of the wallet providers 121, 122, and 123 generates and sends a data feed to the wallet management system 110. The data feeds may include various data of digital wallets that are managed by each of the wallet providers 121, 122, and 123. For example, the data feeds may include a unique digital wallet identifier (e.g., email ID, phone number, username, password, etc.) a listing of card numbers identified in a digital wallet, card schemes for the cards in the digital wallet, an owner/provider of the digital wallet (e.g., merchant, issuer, independent provider, and the like), an indication of whether the digital wallet is stored in a cloud, stored on a user device, how the digital wallet is authenticated (e.g., fingerprint on device of cardholder, wallet on device of cardholder, cloud wallet, PIN, 3D Secure), and the like. Also, the wallet data feeds may be transmitted to the wallet management system 110, for example, at set intervals, randomly, in response to a specific event, in real-time, and the like. Based on the wallet data feeds, the wallet management system 110 may build a wallet management map having some or all of the information received through the wallet data feeds. In the examples herein, the wallet providers 121, 122, and 123, may correspond to different card schemes, issuers, and the like. As a non-limiting example, wallet provider 121 may be a MasterCard wallet provider, wallet provider 122 may be an Amazon wallet provider, and wallet provider 123 may be an issuer controlled provider. It should also be appreciated that the payment cards included within each digital wallet are not limited to a particular card scheme or issuer.

The wallet management system shown in FIG. 1 may include many digital wallet providers including issuers, merchants, schemes like MC/Visa, and the like, which may feed wallet data to a digital wallet repository included in the wallet management system 110 where each wallet provider may be required to send their feed. A user may own two or more digital wallets or may have two or more digital wallets installed on their device. For example, the first digital wallet may be a MasterCard wallet including three MasterCard payment cards. The second digital wallet may be an Amazon wallet including four payment cards including 1 MasterCard payment card from the first wallet. In this example, a cross-relationship will allow a list of all cards owned by one user/entity to be combined from both of the digital wallets. In this case, it does not need to be the MasterCard payment card that is used fraudulently, but any of them, and a flag will be generated for each payment card included in both of the digital wallets. The cross related MasterCard payment card that is the same to both digital wallets in this example may be used to expand the cards owned by the user to include both the payment cards in the first and second digital wallets for fraud detection.

The fraud detection system 130 and/or the authorization system 140 may generate and send a fraud data feed to the wallet management system 110. For example, the fraud detection system 130 may be provided by or included within a card scheme server, a wallet provider, an issuer server, a payment processing server, and the like. Likewise, the authorization system 140 may be provided by or included within a card scheme server, a wallet provider, an issuer server, a payment processing server, and the like. The fraud data feed may include notifications indicating payment cards and/or wallets that have been detected as having security concerns, potential fraud, and/or other related issues.

When the wallet management system 110 receives a notification indicating a payment card has a security concern, the wallet management system 110 may identify a digital wallet that the payment card is associated with. For example, based on information about the payment card included in the wallet management map such as a card number, the wallet management system 110 may identify at least one digital wallet in which the payment card has been previously associated with. The wallet management system 110 may also identify other payment cards associated with the identified digital wallet. Accordingly, the wallet management system 110 may generate a warning such as a flag or other type of notification indicating that the other payment cards included in the digital wallet may be compromised. As a non-limiting example, the wallet management system 110 may generate and store a flag value in a field of the wallet management map corresponding to the other payment cards. Therefore, based on a security concern with one payment card included in the digital wallet, all payment cards included in the digital wallet can have warnings or notifications assigned thereto.

In some examples, a payment card may be included in multiple digital wallets. The wallet management system 110 may detect a payment card in common between a first digital wallet and a second digital wallet. Here, the wallet management system 110 may assume that both the first digital wallet and the second digital wallet belong to the same owner/entity and identify the second digital wallet as a cross related digital wallet, that is, identify a cross-relationship between the first and second digital wallets. If one of the payment cards included in the first digital wallet receives a security notification, the wallet management system 110 may assign notifications to the other payment cards included in the first digital wallet, and also assign notifications to the payment cards included in the second digital wallet (i.e., the cross related wallet). In this case, the payment card in common may be any payment card in the first digital wallet, and not necessarily the payment card receiving the security notification. By determining cross-relationships, the wallet management system 110 can combine a list of payment cards from multiple digital wallets owned by the same entity. Examples of identifying cross-relationships between digital wallets is shown in FIGS. 2A and 2B.

Figure 2A:
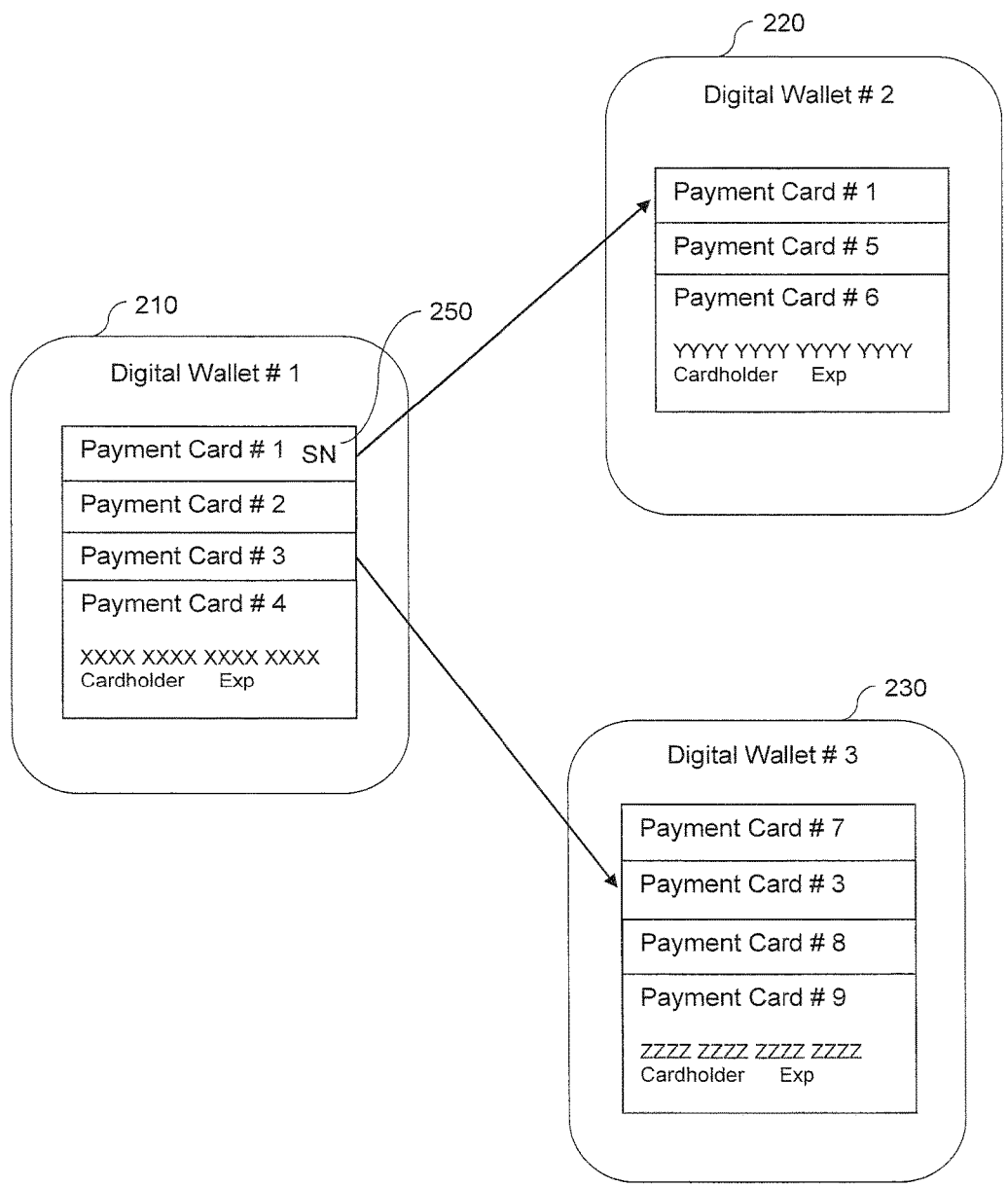
FIGS. 2A and 2B are diagrams illustrating a cross-relationship between digital wallets in accordance with exemplary embodiments.
Figure 2B:
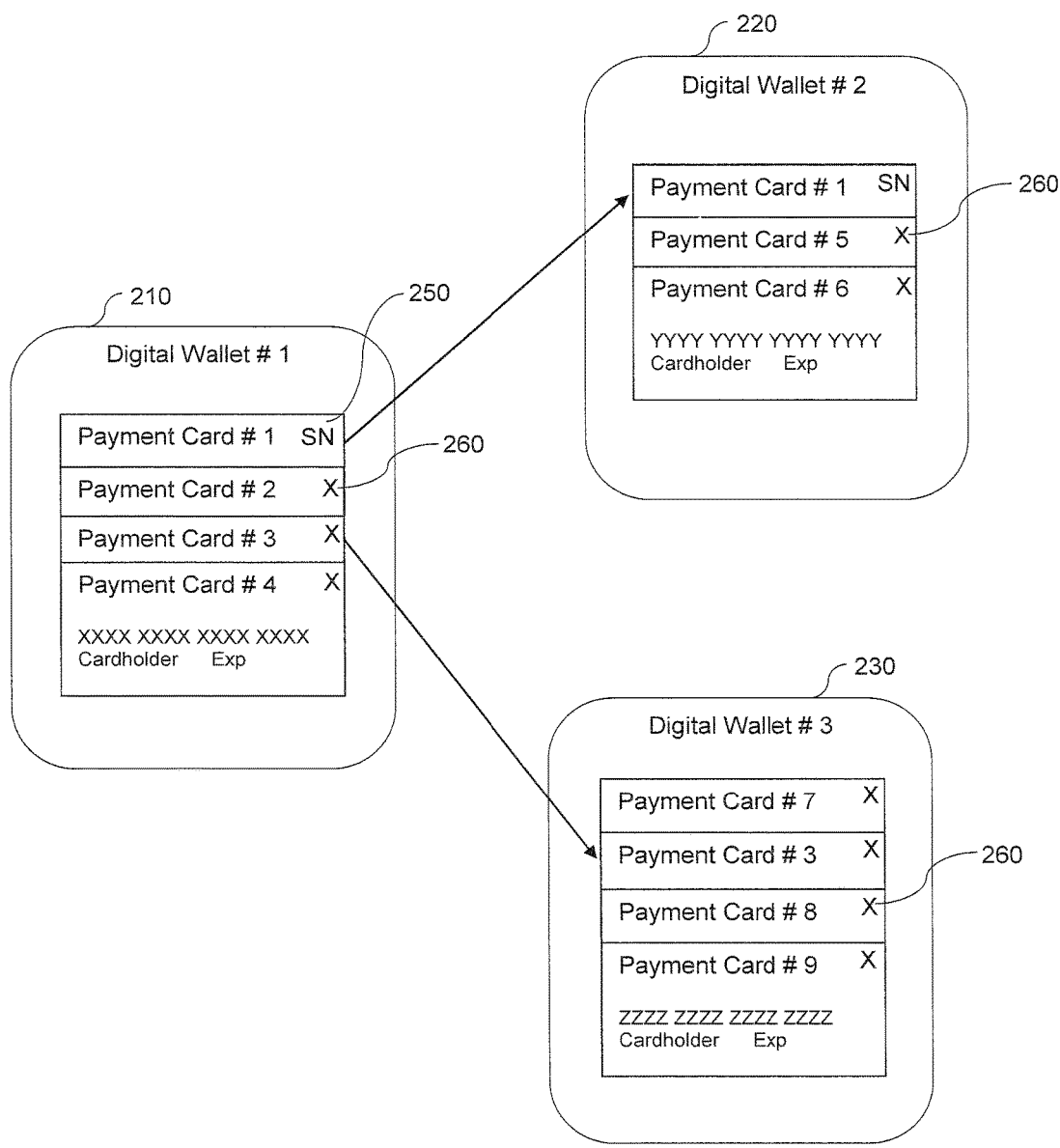

Referring to FIGS. 2A and 2B, a plurality of digital wallets are visually represented for convenience of explanation. While visually represented using graphics in FIGS. 2A and 2B, it should be appreciated that digital wallets and payment cards may be represented differently in implementation, for example, the wallet management map may include numbers, fields, lines, tables, arrays, data values, and the like, and may not include graphical representations. The wallet management map may include an identification of a plurality of digital wallets and an identification of respective payment cards associated with each digital wallet. In this example, a first digital wallet 210 includes four payment cards owned by a user, a second digital wallet 220 includes three payment cards owned by the user, and a third digital wallet 230 includes four payment cards owned by the user. Each of the three digital wallets 210, 220, and 230 may be uniquely identified in the wallet management map controlled by the wallet management system 110 of FIG. 1 based on feeds provided by one or more digital wallet providers such as wallet providers 121, 122, and 123.

In this example, a security notification is received for payment card #1 which is identified as being associated with the first digital wallet 210. For example, the security notification may be received from a data feed provided by one of the fraud detection system 130 and the authorization system 140 shown in FIG. 1. The security notification may indicate a potential fraudulent use or other activity with the card. In response to receiving the security notification, the wallet management system 110 may flag, label, indicate, or otherwise mark payment card #1 as shown by notification flag 250. While the notification is a flag 250 in this example, the examples herein are not limited thereto, and the notification may be any desired method of marking, adding a bit value, or otherwise distinguishing a payment card with a flag, tag, or other notification feature. Because payment card #1 is enrolled in the first digital wallet 210, the other payment cards may be flagged or warnings may be added to notify of the potential for a security issue or concern with the use of these other payment cards. In the example of FIG. 2B, the payment cards 2, 3, and 4 are marked with a flag 260.

In this example, the first digital wallet 210 has a payment card in common with the second digital wallet 220 (i.e., payment card #1). The wallet management system 110 may identify that the second digital wallet 220 is cross related to the first digital wallet 210 based on the common payment card. As a result, the wallet management system 110 may determine or otherwise assume that the first digital wallet 210 and the second digital wallet 220 are owned by the same entity. Accordingly, the wallet management system 110 may flag the other payment cards included in the second digital wallet 220 even though the other payment cards are not in common with the first digital wallet 210. For example, the wallet management system 110 may generate flag 260 or otherwise tag an entry or a field corresponding to payment cards 5 and 6 within the wallet management map.

Similarly, the first digital wallet 210 also has a payment card in common with the third digital wallet 230 (i.e., payment card #3). The wallet management system 110 may identify that the third digital wallet 230 is cross related to the first digital wallet 210 based on the common payment card. As a result, the wallet management system 110 may determine that the first digital wallet 210 and the third digital wallet 230 are owned by the same entity. Also, because of the previous cross relationship determined between the first digital wallet 210 and the second digital wallet 220, the wallet management system 110 may determine that the second digital wallet 220 and the third digital wallet 230 are owned by the same entity. Similar to the second digital wallet 220, the wallet management system 110 may flag the other payment cards included in the third digital wallet 230 even though the other payment cards are not in common with the first digital wallet 210 or the second digital wallet 220. For example, the wallet management system 110 may flag or otherwise tag an entry or a field corresponding to payment cards 7, 8, and 9 within the wallet management map. Although not shown in FIG. 2, it should also be appreciated that one or more additional wallets (not shown) may be cross-related to the second wallet 220 or the third wallet 230, and so on. Accordingly, the cross relationships may continue to be determined until a wallet is determined as having no other cross related wallets.

When the wallet management system 110 detects a fraud notification in one payment card enrolled in a digital wallet, in this case payment card #1 enrolled in the first digital wallet 210, the wallet management system 110 may generate a warning (e.g., a flag, a tag, etc.) for the other payment cards enrolled in the same wallet, and also a warning for any other payment cards enrolled in cross related digital wallets. Accordingly, payment cards 2, 3, and 4 included in the first digital wallet 210 may be flagged, and payment cards 5, 6, 7, 8, and 9 included in the second and third digital wallets 220 and 230 may also be flagged. Therefore, when a person attempts to use one of the other payment cards such as payment cards 2-9, the wallet management system 110 may detect that the payment card has been flagged. By generating the warning of other payment cards, the wallet management system 110 may prevent fraud from occurring with a payment card that has not yet been detected as being used fraudulently. That is, the flagging may prevent fraud from occurring using a payment card included in a digital wallet that is potentially compromised.

In this example, the payment cards do not need to be from the same card scheme, issuer, wallet provider, and the like. As a non-limiting example, payment card #1 may have a MasterCard card scheme, whereas payment cards 2, 3, and 4 may be from different card schemes. Also, it is not necessary for the other payment cards to be used with the respective wallet in order for the warnings to be detected. For example, payment card #5 may be used in-person or remotely to make a purchase from a merchant using the payment card #5 directly, without the digital wallet. In this example, the wallet management system 110 may receive a request to authorize a transaction using payment card #5 from the merchant, an acquiring bank, another authorization system, and the like. When the wallet management system 110 receives the request, the wallet management system 110 may detect that payment card #5 has been previously flagged, and issue an additional challenge or decline the transaction. In this case, the payment card #5 may be used fraudulently or may be used legitimately. Oftentimes, fraudulent use of a payment card goes undetected. Therefore, by taking an extra level of precaution, the system may flag a payment card when a commonly owned card has a problem and the system may issue the user of payment card #5 an additional challenge to verify that the user is the cardholder on file and not someone who is unauthorized to use the card.

In various examples, a master list of other digital wallets to which the cardholder owns may be generated, and each of the cards included in the master list of digital wallets may be flagged. The other digital wallets may be referred to as cross-related digital wallets because they are owned by the same cardholder and may be linked together using various commonalities. In the examples of FIGS. 2A and 2B, a common payment card is used to link together multiple digital wallets owned by the same cardholder. As another example, common identifiers of the cardholder may be used instead of or in addition to the common payment cards. The identifiers may include, for example, an email address, a phone number, a home address, and the like. As another example, digital wallets running on a same device may be linked with one another by comparing device fingerprints or device information associated with the digital wallets. For example, digital wallets having a same device type, International Mobile Station Equipment Identity (IMEI) number, device ID, installed fonts, installed apps, mobile network operators (MNOs), and the like, may be determined as being installed on the same device and be linked together. Accordingly, digital wallets may be linked together as being owned by a common owner, or as being installed on the same device, even though the digital wallets do not share payment cards in common.

Referring again to FIG. 1, the wallet management system 110 may store the generated wallet management map identifying payment cards from multiple digital wallets owned by the same entity. According to various examples, the wallet management system 110 may be included within a number of devices within the network 100, although for convenience of explanation it is shown as a standalone system in FIG. 1. For example, the wallet management system 110 may be included within a card processing scheme server, a merchant system, an issuer system, a payment service providing system, a third party, and the like. That is, a location of the wallet management system 110 is not limited.

In FIG. 1, when the cardholder 150 attempts to make a purchase with the merchant 160, either using a digital wallet or using a payment card directly, the merchant 160 (or an acquiring bank thereof) may transmit a request to the authorization system 140 to authorize the transaction. The authorization system 140 may be included with the wallet management system 110, or they may be separate entities. The authorization system 140 may determine whether to authorize the transaction based on the wallet management system 110. For example, information about the transaction including a payment card number, digital wallet ID, and the like, may be transmitted to the wallet management system 110. The wallet management system 110 may check the wallet management map to determine whether there is a security notification or a warning for the payment card based on the information about the transaction such as the payment card number. If no warning is found, the wallet management system 110 may approve the use of the payment card or otherwise indicate that the payment card does not have any warnings. As another example, if a warning is found, the wallet management system 110 may issue a step-up challenge to the cardholder of the payment card to verify an identity of the cardholder. As another example, the wallet management system 110 may decline the transaction. The approved use, denial, and/or additional challenge information may be provided to the authorization system 140.

Figure 3:
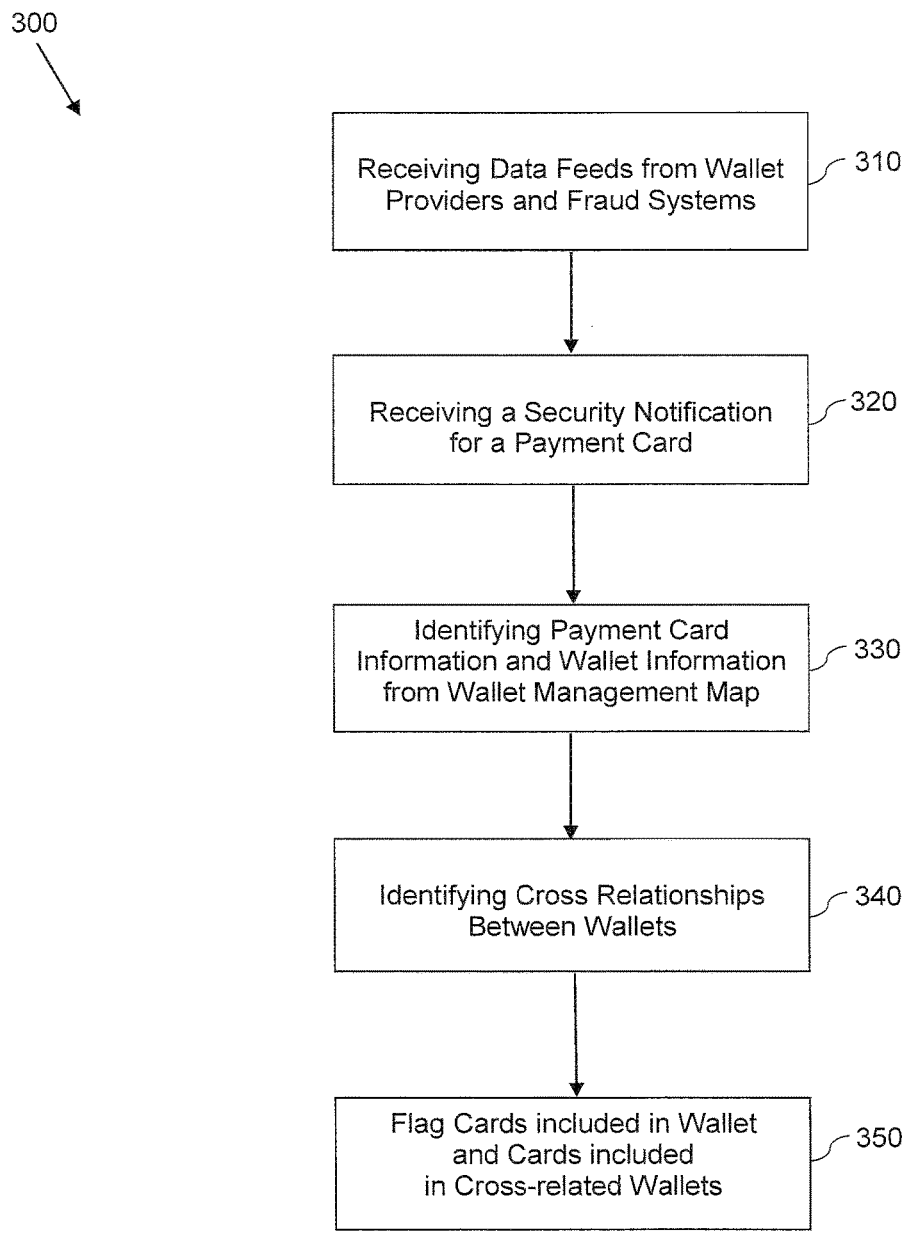
FIG. 3 is a diagram illustrating a method of generating a wallet management map in accordance with an exemplary embodiment.

FIG. 3 illustrates a method 300 of generating a wallet management map in accordance with an exemplary embodiment. For example, the method 300 may be performed by the wallet management system of FIG. 1. Referring to FIG. 3, in 310, data feeds are received from wallet providers and from fraud detection systems. In some instances, there may be only a single wallet provider, a few wallet providers, or many wallet providers, for example, ten, twenty-five, fifty, one hundred, or more wallet providers. The data feed from each wallet provider may include similar information or it may include different information. As a non-limiting example, the data feed may also be referred to as a wallet feed and may include one or more of a unique wallet identifier, a listing of card numbers identified in that wallet, card schemes for the cards in the wallet, who owns/provides the wallet (e.g., merchant, issuer, independent provider, and the like), an indication of whether the wallet is stored in a cloud, stored on a user device, how the wallet is authenticated, and the like. Based on the data feeds received in 310, the wallet management system may construct a wallet management map and continually or periodically update the wallet management map as the data feeds continue to be received.

The data feeds from the fraud detection systems and/or authorization systems may include information indicating a payment card and/or a digital wallet has a security notification such as a payment card or a digital wallet has been locked, has been declined, and the like. In 320, the method further includes receiving a security notification for a payment card from a fraud detection system or authorization system. The wallet management system may determine that the payment card having the security notification is included within the wallet management map, for example, based on a payment card number, a wallet ID, a user ID, and the like. In 330, a digital wallet which the payment card is associated with is identified based on the wallet management map. In addition, one or more other payment cards associated with the identified digital wallet are identified based on the wallet management map. In 340, the method further includes identifying cross related digital wallets and payment cards included therein based on a payment card in common such as shown in the example of FIG. 2.

Based on the received security notification for the payment card, warnings for other payment cards included in the same digital wallet may be generated by the wallet management system, in 350. The wallet management system 350 may store the warning in the wallet management map. As an example, the warning may include an indicator of the initial security notification received through one of the feeds or received through another channel or resource. The wallet management system 350 may monitor/verify the continued existence of such security notification and erase the warning once the security notification has been removed or cleared. For example, the warning may be a flag, a tag, a marking, a bit value, and the like. Accordingly, the wallet management map may include, for each digital wallet, a wallet identifier, an identification of an issuer of the respective digital wallet, an identification of a card number of each payment card associated with the respective digital wallet, and an indication for each payment card of whether a warning (e.g., security notification) has been generated for the payment card.

According to various aspects, the method 300 of generating a wallet management map may be continuously performed or may be performed in a continuous loop. As another example, the method 300 may be performed periodically or in response to a triggering event such as a new payment card or digital wallet being added, fraud being detected, and the like. For example, the plurality of data feeds may be received on a periodic basis, on a random basis, and/or initiated by a specific event occurring, and the wallet management map may be updated to reflect any changes. Also, the order of the method is not limited to that as shown in FIG. 3. For example, the security notification may be received prior to identifying wallet information and/or cross related wallet information.

Figure 4:
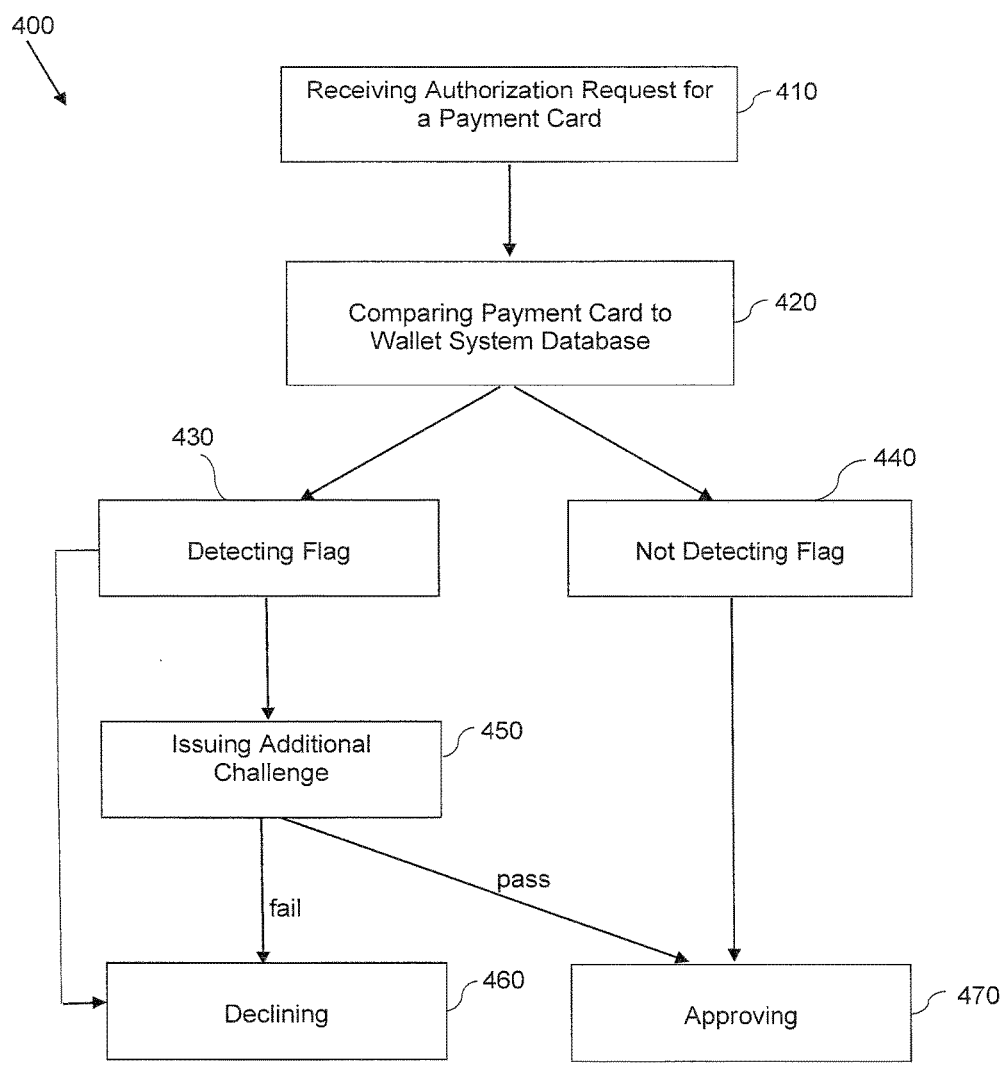
FIG. 4 is a diagram illustrating a method of processing a transaction in accordance with an exemplary embodiment.

FIG. 4 illustrates a method 400 of processing a transaction in accordance with an exemplary embodiment. For example, the method 400 may be performed by the wallet management system shown in FIG. 1, or another device. Referring to FIG. 4, in 410 a request to authorize a transaction is received. For example, a cardholder may attempt to use a payment card to purchase items (e.g., goods or services) from a merchant. To authorize the transaction, the merchant may transmit information about the payment card to the wallet management system. In 420, the payment card information may be compared to the wallet management map such as the wallet management map described in the example of FIG. 3, and the method 400 may determine that the payment card is included within the wallet management map. Accordingly, the wallet management system may identify a digital wallet that the payment card is associated with and one or more other payment cards that are also associated with the digital wallet.

Prior to authorizing the transaction, the wallet management system may determine whether the payment card has received a notification and/or a warning based on the wallet management map. For example, in 430 the wallet management system may detect a flag or other notification indicating the payment card has a warning associated therewith. Accordingly, the wallet management system may issue an additional challenge to a cardholder of the payment card in 450 or decline the transaction in 460. If the additional challenge is successful in 450, the wallet management system may approve the transaction in 470, otherwise the wallet management system may decline the transaction in 460. On the other hand, in 440 the wallet management system may not detect a warning or notification for the payment card, and may authorize the transaction in 470.

In the example of FIG. 4, the wallet management system may receive a request to authorize a payment card being used in a transaction and determine a digital wallet that the payment card is associated with. In this case, if a security notification for another payment card associated with the identified digital wallet or a cross related digital wallet has been previously received, the wallet management system may have previously flagged the payment card or generated a warning for the payment card indicated that the payment card might be compromised. As a result, the wallet management system may decline the transaction or issue an additional challenge to a cardholder of the payment card, in response to detecting the security notification for the other payment card.

For example, according to various aspects, a payment/purchase may be initiated with a merchant. In response, the merchant may call an authentication system such as a card scheme authentication system to authenticate the transaction. According to various aspects, the authentication system may capture the card number or other identifying information and look up the card with the wallet management system. The wallet management system may determine whether this card is flagged, or if the card is part of a wallet that is flagged. If flagged, the merchant may receive a decline message or a new challenge may be issued to cause the user to go through one or more authentication steps. If not flagged, the transaction will be approved. Also, instead of storing the actual card numbers by the wallet management system, a hash value of the card number may be stored in all of the transactions, and the comparing and aligning by the wallet management system may be done using the hash number instead of a payment card number.

Figure 5:
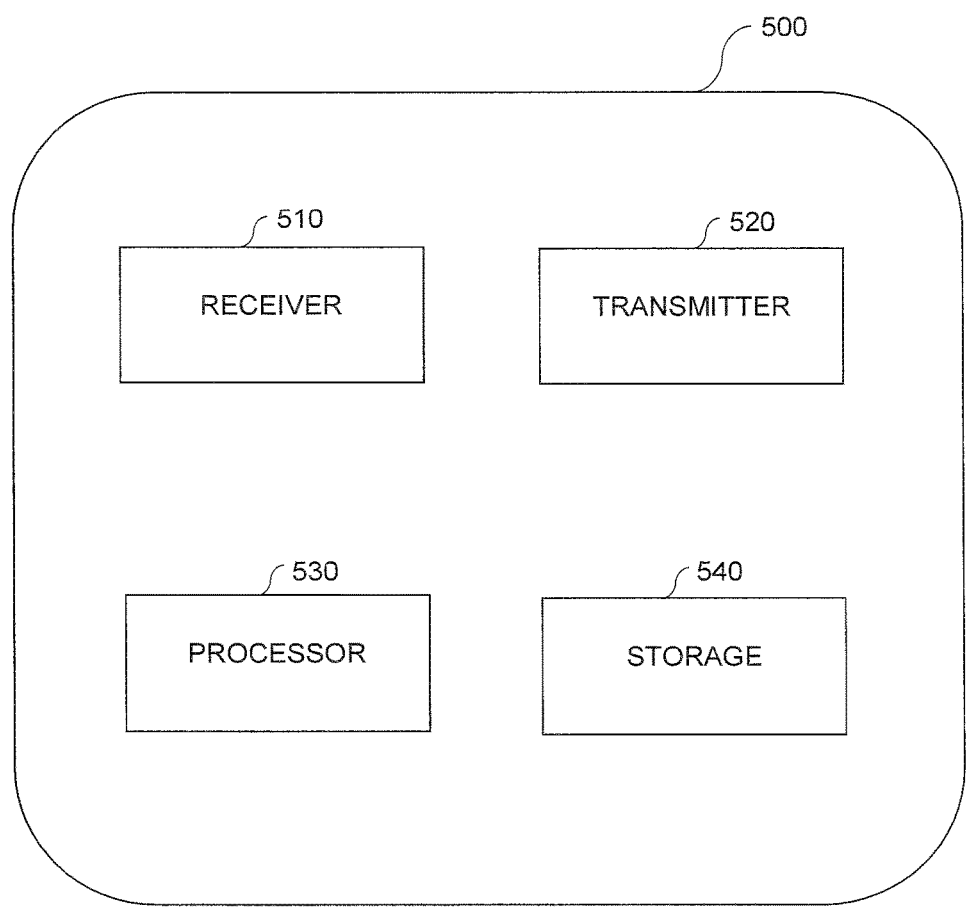
FIG. 5 is a diagram illustrating a wallet management device in accordance with an exemplary embodiment.

FIG. 5 illustrates a wallet management device 500 in accordance with an exemplary embodiment. For example, the wallet management device 500 may correspond to the wallet management system shown in FIG. 1. Referring to FIG. 5, the wallet management device 500 includes a receiver 510, a transmitter 520, a processor 530, and a storage 540. The wallet management device 500 may also include other features that are not specifically shown in FIG. 5.

The receiver 510 may receive a plurality of data feeds. For example, the plurality of data feeds may include a data feed from at least one wallet provider to many wallet providers and a data feed from at least one fraud system to many fraud systems. The processor 530 may build a wallet management map based on the plurality of data feeds including information uniquely identifying each digital wallet and the payment cards included therein, and any other cross related digital wallets. According to various aspects, the receiver 510 may receive a security notification for a payment card from one of the fraud systems. In response, the processor 530 may identify a digital wallet to which the payment card is associated with based on the wallet management map which is generated based on the received data feeds. The processor 530 may also identify one or more other payment cards associated with the identified digital wallet, generate a warning for the one or more other identified payment cards, and store the wallet management map including the warning in the storage 540. Accordingly, the stored wallet management map may be used during an authorization request for the one or more other identified payment cards.

In some examples, the receiver 510 may receive a request to authorize a transaction from a merchant, an acquirer, an issuer, or an authorization system. The processor 530 may detect a payment card being used in the transaction from payment account information included in the request such as the primary account number, and the like. The processor may compare the detected payment card to the wallet management map and determine whether the payment card has been flagged. For example, the wallet management map may include, for each of the identified plurality of digital wallets, a wallet identifier, an identification of a provider of the respective digital wallet, an identification of a card number of each payment card associated with the respective digital wallet, and an indication of whether there is a warning for each payment card. The wallet management map may further identify a cross-related digital wallet having a payment card in common with the identified digital wallet, and generate the warning for one or more other payment cards associated with the identified cross-related digital wallet. In response to detecting that the warning has been issued for the detected payment card, the transmitter 520 may transmit a decline message or transmit a step-up challenge to further challenge the identity of the user to determine if the user is the cardholder.

Various embodiments relate to a system and method for managing digital wallets. The system may build a wallet management map which uniquely identifies each digital wallet and other cross related digital wallets owned by the same entity. The system may receive a plurality of data feeds from wallet providers in order to build the wallet management map. The system may also receive data feeds from various fraud systems. The system may use tagging of a field in the wallet management map to indicate whether any security notification has occurred on a wallet or not. For example, has a transaction been blocked or a card been locked for any card in the wallet. This notification including a card number may be provided by an issuer system, a payment processing system, a card scheme system, and the like. The system may check its database to determine if the card number belongs to any of the wallets within its repository. If it does, the entire wallet is flagged. Then a cross-relationship may further be established in which all cards from that wallet, and all cards in other cross-related wallets are linked together. The result is card information, wallet information, and flag information for each card entry. When a user attempts to make a payment using a payment card that has been flagged by the system, an additional challenge may be issued by the system, or the transaction may be declined.

As used herein, the terms card, transaction card, financial transaction card, payment card, and the like, refer to any suitable transaction card, such as a credit card, a debit card, a prepaid card, a charge card, a membership card, a promotional card, a frequent flyer card, an identification card, a gift card, and the like, and also refer to any suitable payment account such as a deposit account, bank account, credit account, and the like. As another example, the terms may refer to any other device or media that may hold payment account information, such as mobile phones, Smartphones, personal digital assistants (PDAs), key fobs, computers, and the like. The transaction card can be used as a method of payment for performing a transaction.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A wallet management method comprising:
   receiving a plurality of data feeds including a data feed from at least one wallet provider and a data feed from at least one fraud system;
   receiving a security notification for a payment card included in a first digital wallet;
   identifying cross-relationship between the first digital wallet and a second digital wallet based on at least one of a payment card and a user attribute which is shared by both the first and second digital wallets; and
   generating a warning for a different payment card that is included in the cross-related second digital wallet based on the identified cross-relationship; and
   storing the warning for use during an authorization request of the different payment card.

2. The method of claim 1, wherein the received data feeds correspond to a plurality of digital wallets and a plurality of digital wallet providers.

3. The method of claim 1, further comprising generating a wallet management map based on the received data feeds, the wallet management map comprising an identification of a plurality of digital wallets and an identification of respective payment cards included within each digital wallet,
   wherein the identifying of the one or more other payment cards associated with the identified digital wallet is based on the generated wallet management map.

4. The method of claim 3, wherein the wallet management map comprises, for each of the identified plurality of digital wallets, a wallet identifier, an identification of a provider of the respective digital wallet, an identification of a card number of each payment card associated with the respective digital wallet, and an indication of whether there is a warning for each payment card.

5. The method of claim 1, wherein the identifying comprises identifying the cross-relationship with the second digital wallet based on a payment card in common between the first and second digital wallets.

6. The method of claim 5, wherein the payment card in common is a different payment card than the payment card receiving the security notification.

7. The method of claim 1, wherein the identifying comprises identifying the cross-relationship with the second digital wallet based on at least one of an email address, a phone number, and an address in common between the first and second digital wallets.

8. The method of claim 1, wherein the received security notification indicates that the payment card has been locked for security reasons or the payment card was used in a transaction that was blocked for security reasons.

9. The method of claim 1, wherein the identifying comprises identifying the cross-relationship with the second digital wallet based on a device identifier in common between the first and second digital wallets.

10. A transaction processing method comprising:
    receiving a request to authorize a payment card included in a first digital wallet;
    identifying a cross-related digital wallet having at least one of a payment card and a user attribute in common with the first digital wallet;

detecting a security notification for a different payment card included in the identified cross-related digital wallet; and at least one of declining the transaction and issuing an additional challenge to a cardholder of the payment card, in response to detecting the security notification for the different payment card included in the cross-related digital wallet.

11. The method of claim 10, wherein the security notification for the different payment card in the cross-related digital wallet is detected based on a wallet management map.

12. The method of claim 11, wherein the wallet management map comprises an identification of a plurality of digital wallets, an identification of respective payment cards associated with each digital wallet, and an indication of whether there is a warning for each payment card.

13. A wallet management device comprising:

a receiver configured to receive a plurality of data feeds including a data feed from at least one wallet provider and a data feed from at least one fraud system, and receive a security notification for a payment card included in a first digital wallet;

a processor configured to identify a cross-relationship between the first digital wallet and a second digital wallet based on at least one of a payment card and a user attribute which is shared by both the first and second digital wallets, and generate a warning for a different payment card that is included in the cross-related second digital wallet based on the identified cross-relationship; and a storage configured to store the warning for use during an authorization request of the different payment card.

14. The wallet management device of claim 13, wherein the receiver is configured to receive a plurality of data feeds corresponding to a plurality of digital wallets and a plurality of digital wallet providers.

15. The wallet management device of claim 13, wherein the processor is further configured to generate a wallet management map based on the received data feeds, the wallet management map comprising an identification of a plurality of digital wallets and an identification of respective payment cards included within each digital wallet from among the plurality of digital wallets, and the processor is configured to identify the one or more other payment cards associated with the identified digital wallet based on the generated wallet management map.

16. The wallet management device of claim 15, wherein the wallet management map comprises, for each of the identified plurality of digital wallets, a wallet identifier, an identification of a provider of the respective digital wallet, an identification of a card number of each payment card associated with the respective digital wallet, and an indication of whether there is a warning for each payment card.

17. The wallet management device of claim 13, wherein the processor is further configured to identify the cross-relationship with the second digital wallet based on a payment card in common between the first and second digital wallets.

18. The wallet management device of claim 17, wherein the payment card in common is a different payment card than the payment card receiving the security notification.

19. The wallet management device of claim 13, wherein the received security notification indicates that the payment card has been locked for security reasons or the payment card was used in a transaction that was blocked for security reasons.

20. The wallet management device of claim 13, wherein the receiver is further configured to receive a request to authorize a payment card being used in a transaction, and the processor is further configured to issue a notice declining the transaction or an additional challenge to a cardholder of the payment card, in response to detecting a warning for the payment card.

* * * * *